3,640,917
CELLULAR PLASTICS OF EPOXY RESINS AND
PROCESS FOR THEIR MANUFACTURE
Ernst Nölken, Frankfurt am Main, Germany, assignor to
Farbwerke Hoechst Aktiengesellschaft vormals Meister
Lucius & Bruning, Frankfurt am Main, Germany
No Drawing. Filed Jan. 23, 1969, Ser. No. 793,593
Claims priority, application Germany, Jan. 25, 1968,
P 17 20 776.0
Int. Cl. C08g 53/10
U.S. Cl. 260—2.5
10 Claims

ABSTRACT OF THE DISCLOSURE

A process for foaming and hardening an epoxy resin or mixtures thereof with a lactone or a cyclic ether under the action of inert readily volatile organic solvents as foaming agents and fluophosphoric acid or mixtures of fluophosphoric acid with other phosphorus compounds as hardeners.

The present invention relates to cellular plastics of epoxy resins and a process for their manufacture.

It has been proposed to harden epoxy resins with Lewis acids, for example boron trifluoride, tin tetrachloride, antimony pentachloride and aluminum chloride or with acids, for example phosphoric acid and benzene-1,3-disulfonic acid. It has also been proposed to make cellular plastics by carrying out the hardening in the presence of low-boiling solvents as expanding agents.

Cellular plastics of epoxy resins manufactured with the use of Lewis acids as catalysts have undesirable properties, for example shrinkage and crack growth. When hardening low-viscous epoxy resins with orthophosphoric acid and producing cellular plastics by addition of an expanding agent and a pore regulator to the epoxy resin a complete mixture of the resin component with the orthophsphoric acid is difficult to obtain as hardening starts rapidly. On the other hand, the cross-linking of the resin is uncomplete so that relatively large proportions of low-molecular product can be extracted.

It has, furthermore, been proposed to copolymerize epoxy resins with cyclic ethers, for example oxiranes, oxacyclobutane and their derivatives, tetrahydrofurans and lactones.

By this copolymerization valuable hardened products cannot be obtained when using Lewis acids as catalysts or phosphoric acid and polyphosphoric acid esters as hardeners.

Now, I have found that cellular plastics can be obtained by hardening epoxy compounds with more than one epoxy group in the molecule in the presence of inert readily volatile organic solvents as foaming agents, if desired pore regulators and/or lactones or cyclic ethers copolymerizable with epoxy resins, comprising using fluophosphoric acid, if desired in admixture with acid phosphorous compounds, as hardener.

By epoxy resins there are to be understood compounds having more than one epoxy group in the molecule. In general the epoxy resins advantageously contain at most 10 epoxy groups in the molecule. Suitable epoxy resins are, for example, reaction products of epichlorhydrin with polyhydric alcohols, and especially with mononuclear and polynuclear polyvalent phenols. Diglycidic- and polyglycidic esters may also be used. Compounds, which are obtained by epoxidation of di- and polyolefins, dienes, cyclic dienes and diolefinically unsaturated carboxylic acid esters, are also suitable for foaming. Telomers and cotelomers containing glycidyl ether- and/or glycidic ester groups may also be used. Reaction products of 2,2-diphenylol propane with epichlorhydrin are preferably used.

Epoxy resins that are liquid at room temperature and have epoxy equivalents of from 100 to 300 are preferably used. However, there may also be used solid epoxy resins or those which have higher epoxy equivalents provided that they can be maintained in the liquid state by addition of foaming agents, reactive thinners or comonomers.

The fluophosphoric acid is an easily accessible acid. Its preparation from, for example, phosphorus pentoxide and aqueous hydrofluoric acid of 69% strength, phosphorus oxytrifluoride and orthophosphoric acid from metaphosphoric acid and hydrogen fluoride, orthophosphoric acid and difluophosphoric acid has been described in the literature. The preparation of fluophosphoric acid by reaction of aqueous hexafluophosphoric acid of from 65 to 75% strength with pyrophosphoric acid and from polyphosphoric acid with hydrogen fluoride, which, however, does not form an object of this invention, proved to be advantageous.

The fluophosphoric acid may be added directly to the epoxy resin mixed with a pore regulator and a foaming agent.

It is, however, advantageous to add it together with solvents or complex-forming substances which are not copolymerizable with epoxy resins.

Suitable solvents or complex-forming substances not copolymerizable with epoxy resins are ethers, for example diethyl ethers, diisopropyl ethers, dioxane, ethylene glycol dimethyl ether, diethylene glycol dimethyl ether, diethylene glycol diethyl ether, ketones, for example acetone, methylethyl ketone, methyl isobutyl ketone, esters, for example methyl- and ethyl formate, methyl-, ethyl-, butyl- and phenyl acetate, glycol monoacetate, oxalic acid diethyl ester, succinic acid diethyl ester or adipic acid diethyl ester.

It is particularly advantageous, however, to use fluophosphoric acid in the form of a solution thereof in monomers which copolymerize with the epoxy resin, for example cyclic ethers and lactones, or in the form of a solution in compounds which react with the epoxy resin by polyaddition, for example alkyl phosphonic acids, phosphoric acid monoesters or aromatic polyhydroxyl compounds, for example bisphenols and novolaks.

As lactones the following compounds may be used, for example,

β-propiolactone,
3-mehtyl-β-propiolactone,
4-mehtyl-β-propiolactone,
3,3-dimethyl-β-propiolactone,
4-trichloromethyl-β-propiolactone,
4,4-bis-(trichloromethyl)-β-propiolactone,
γ-butyrolactone,
δ-valerolactone,
2-methyl-δ-valerolactone, monomethyl-, monoethyl-, monopropyl-, monoisopropyl etc. up to monododecyl-ε-caprolactone,
dialkyl-ε-caprolactones, in which the two alkyl groups are linked to the same or to different carbon atoms, but not both to the ε-carbon atom, trialkyl-ε-caprolactones in which two or three carbon atoms in the lactone ring are substituted, alkoxy-ε-caprolactones, for example, methoxy- and ethoxy-ε-caprolactones, cycloalkyl-, aryl and aralkyl-ε-caprolactones, for example cyclohexyl-, phenyl- and benzyl-ε-caprolactones. There may also be used lactones with more than 6 carbon atoms in the ring, for example ζ-enatolactone and η-caprolactone.

As a monomer in which fluophosphoric acid can be dissolved and then added to the epoxy resin containing foaming agent and pore regulator, ε-caprolactone proved particularly advantageous.

As reactive solvents for the catalyst cyclic ethers copolymerizable with epoxy resins, for example propylene oxide, epichlorohydrin, phenyl glycidyl ether, oxacyclobutane, 3-methyl-oxacyclobutane, 3,3-bis-(chloromethyl)-oxacyclobutane and tetrahydrofurane, may also be used.

On the addition of the comonomers mentioned to the catalyst heat is liberated and therefore the mixture is generally first cooled to room temperature and may then be used directly for the foaming of the epoxy resin. It is also posible, however, first to polymerize the monomer and then to use the prepolymer for foaming.

The concentration of the fluophosphoric acid in the lactone or in the cyclic ethers copolymerizable with epoxy resins or in the solvent not copolymerizable with epoxy resins is generally within the range of from 1 to 80% by weight, preferably from 5 to 60% by weight, and the amount of catalyst is generally within the range of from 1 to 30 mole percent, preferably from 2 to 15 mole percent, calculated on the average epoxide equivalent of the resin used.

Alternatively, the comonomers mentioned may first be added in amounts of generally from 1 to 30% by weight to the epoxy resin containing a foaming agent, a pore regulator, but not yet a hardener, the latter being added only after the whole has been mixed thoroughly.

As further reactive solvents, that is solvents entering into additive combination with epoxy resins, for the catalyst there may also be used phosphonic acids, for example methyl-, ethyl-, vinyl-, 2-chloroethyl-, propyl-, butyl-, phenyl-, hydroxymethane-$\alpha$-hydroxyethane-, $\alpha$-hydroxypropane- and $\alpha$-hydroxy-$\alpha$-phenylmethane-phosphonic acid or monoalkyl-, monocycloalkyl- and monoaryl esters of phosphoric acid, for example the methyl-, ethyl-, propyl-, isopropyl-, n-butyl-, i-butyl-, tert.-butyl-, methoxyethyl-, butoxyethyl-, phenyl-2-methylphenyl-, 3-methylphenyl-, 2,4,6-trichlorophenyl- or 2,4,6-tribromophenyl phosphoric acid ester. As phosphoric acid esters there may also be used the phosphoric acid monoesters having a proportion of diesters and which are obtained by the reaction of phosphorus pentoxide with alcohols or phenols.

Furthermore the following phosphorus compounds may, for example, be used: orthophosphoric acid, phosphorus acid, pyrophosphoric acid, polyphosphoric acid, polyphosphoric acid esters, for example tetraalkyldiphosphoric acid or hexaalkyltetraphosphoric acid, which can be obtained, for example, by the reaction of trialkylphosphates with phosphorus pentoxide in the corresponding quantitative ratios. However, there may also be used acid polyphosphoric acid esters of di-, tri-, tetra- or pentaphosphoric acid as they can be obtained by the reaction of phosphoric acid mono- and diesters with $P_2O_5$ or of phosphoric acid mono-, di- and trialkyl esters with polyphosphoric acid which is easier to treat than $P_2O_5$.

Besides the alkyl esters of the polypohsphoric acid derivatives mentioned, the alkyl groups of which may have from 1 to 10 carbon atoms, may be linear or branched and substituted by halogen, there may also be used aryl esters, for example phenyl-, methylphenyl-, chlorophenyl- and 1,3,5-tribromophenyl-esters.

Furthermore, there may also be used reaction products of the neutral and acid polyphosphoric acid esters with aliphatic and cycloaliphatic diols, triols, polyether diols and polyvalent phenols, for example resorcinol and polyvalent polynuclear phenols, for example 4,4'-dioxydiphenyl-methane or 4,4'-dioxy-diphenyl-2,2-propane.

The said phosphorus compounds, which are used together with the fluophosphoric acid, may be used in amounts up to the equivalent amounts calculated on the epoxy resin, that is a hydroxy equivalent of the phosphorus compound for an equivalent of epoxide. However, as to the foaming properties it has proved advantageous to use smaller amounts of the above phosphorus compounds than the equivalent amounts, preferably from 0.2 to 0.6 hydroxyequivalent for an epoxy equivalent.

The acid which is on the market under the name of Monofluophosphoric Acid and which, according to the elementary analysis, corresponds to the formula $$FPO(OH)_2$$

also contains small amounts of orthophosphoric acid and difluophosphoric acid as nuclear resonance measurements have shown.

The cellular structure of the cellular plastics obtained with the catalyst in accordance with the invention depends substantially on the content of orthophosphoric acid. Thus, when using a 20% solution of monofluophosphoric acid in orthophosphoric acid open-cell cellular plastics are obtained, with monofluophosphoric acid of from 30 to 100% strength the cells are substantially closed. The closed-cell structure increases with the concentration of fluophosphoric acid in the orthophosphoric acid.

As solvents for the fluophosphoric acid lactones and cyclic ethers may also be used together with the phosphorus compounds.

Finally, the reaction products known as novolaks of monovalent or polyvalent mononuclear or polynuclear phenols with formaldehyde may also be added to the foaming mixture.

The foaming of the epxoy resins is carried out in known manner by addition of easily vaporizing halogenated hydrocarbons or hydrocarbons, for example monofluorotrichloromethane, monofluorodichloromethane, 1,2,2-trichlorotrifluoromethane, 1,2-dichlorotetrafluorethane, methylene chloride or pentane.

The foaming agent is generally used in amounts of from 5 to 30% by weight, calculated on the epoxy resin. In order to obtain pores which are as uniform as possible it is advantageous to add pore regulators, for example silicone oils. Furthermore, fillers, dyestuffs, plasticizers or fire retarding agents may be added to the mixture to be foamed.

For making cellular plastics, the mixture of epoxy resin, foaming agent and silicone oil is stirred, for example, with the reactive solvent containing the catalyst. However, it is also possible to mix the catalyst component, to which the pore regulator and foaming agent have been added, with the liquid epoxy resin. The mixing may be carried out in batches by means of appropriate stirrers or continuously on foam machines, injection or mixing process being used to obtain foamed articles of determined shape. The pot life of the foam mixture depends on the epoxy resin used, the catalyst concentration and the chosen initial temperature of the individual components.

Generally the mixture can be stirred for 10 to 30 seconds, which is sufficient to obtain an intense homogenizing.

The components to be mixed may have the same or different temperatures within the range of from 5 to 45° C., preferably from 10 to 35° C. Foaming is generally terminated after 10 to 60 seconds and the foam is non-adhesive after 20 seconds up to a few minutes.

The reaction mixture to be foamed according to the invention is distinguished by a good processibility and the foams so obtained have good mechanical properties as well as only little tendency to crack growth in the foam interior. Furthermore, the fluophosphoric acid confers self-extinguishing properties to the cellular plastics.

The cellular plastics obtained by the process of the invention can be used as packaging material, in sandwich constructions and as insulating material against cold, heat, sound and shock as well as in the field of electrical engineering. They are distinguished by a particularly good adhesion to materials such as, for example, stone, ceramics and plastics.

The following examples serve to illustrate the invention, but are not intended to limit it, the parts being by weight and the product used as epoxy resin being a diglycidyl ether of 4,4'-dioxy-diphenyl-2,2 propane with the epoxy equivalent of 190 and a viscosity of 11,800 cp. at 25° C. The silicone oil used is a commercial product of UCC having the name L531.

EXAMPLE 1

1000 parts of epoxy resin were mixed with 10 parts of silicone oil and 150 parts of trichlorofluoromethane. The viscosity of the mixture was 1,100 cp. at 25° C. 28 parts of fluophosphoric acid and 12 parts of orthophosphoric acid were dissolved in 50 parts of ϵ-caprolactone and cooled to 25° C. This catalyst solution was homogeneously mixed within 18 seconds with the epoxy resin containing a foaming agent and a pore regulator by means of an impeller and the mixture to be foamed was immediately poured into a mould. The foam rose within 50 seconds and was non-adhesive after 11 minutes. A colourless, homogeneous body having a density of 30 g./l. was obtained. Its compressive strength was 1.6 kg./cm.$^2$, its dimensional heat stability according to Martens (DIN 53424) was 90° C. The cells were closed to an extent of 76%.

The mixture of fluophosphoric acid and orthophosphoric acid used as catalyst had been prepared by reaction of pyrophosphoric acid with aqueous hexafluophosphoric acid of 65% strength in a weight ratio of 89/22.4. It contained, in addition to ortho- and fluophosphoric acid, 3% by weight of difluophosphoric acid.

EXAMPLE 2

The process was carried out as in Example 1, while using, however, as hardener, a solution of 25 parts of fluophosphoric acid and 75 parts of orthophosphoric acid in 150 parts of ϵ-caprolactone. The rising time was 20 seconds. The foamed body was non-adhesive after 40 seconds. Its compressive strength was 3 kg./cm.$^2$ at 33 g./l. A completely open-cell cellular plastic was obtained.

EXAMPLE 3

The process was carried out as in Example 1, while using, however, as catalyst, a solution of 21 parts of fluophosphoric acid and 9 parts of orthophosphoric acid in 50 parts of vinyl phosphoric acid. The compressive strength of the cellular plastic was 1 kg./cm.$^2$ at 45 g./l. The cells were closed to an extent of 74%.

EXAMPLE 4

1,000 parts of epoxy resin were mixed with 10 parts of silicone oil and 150 parts of trifluorochloromethane. Then, 100 parts of a condensation product of phenol and formaldehyde were dissolved in 50 parts of ϵ-caprolactone and stirred with 30 g. of a mixture of fluophosphoric acid and orthophosphoric acid in a weight ratio of 80 to 20. Within 15 seconds the catalyst solution was mixed with the component of epoxy resin and introduced into a mould. Foaming started immediately and the foam came up to its full height within a minute. A foamed body with closed cells to an extent of 82% and having a density of 36 g./l. and a compressive strength of 2.6 kg./cm.$^2$ was obtained.

The condensation product of phenol and formaldehyde had been prepared by reaction of phenol with formaldehyde in a molar ratio of 5:1 in the presence of an acid catalyst. The phenol in excess was distilled off in vacuo.

The mixture of fluophosphoric acid and orthophosphoric acid had been prepared by reaction of polyphosphoric acid with 19% by weight of hydrogen fluoride.

EXAMPLE 5

In 665 parts of the epoxy resin of Example 4, 285 parts of epoxy resin of high molecular weight, which had been obtained by reaction of 4,4'-dioxydiphenyl-2,2-propane with epichlorhydrin and had a melting point of 75° C. and an epoxy equivalent of 500 were dissolved at elevated temperature. After cooling to 40° C. the solution was diluted with 50 g. of ϵ-caprolactone and mixed at 25° C. with 10 parts of silicone oil and 150 parts of trichlorofluoromethane. Then 25 parts of fluophosphoric acid were dissolved in 42.7 parts of ϵ-caprolactone, cooled to 25° C. and, by means of an impeller, mixed within 15 seconds with the epoxy resin containing foaming agent and pore regulator and immediately poured into a mould. After 100 seconds the foam had reached its full height and was non-adhesive after a further 60 seconds. The foamed body so obtained had a compressive strength of 1.8 kg./cm.$^2$ at a density of 28 g./l., closed cells to an extent of 89% and a dimensional heat stability according to Martens of 91° C.

What is claimed is:

1. In a process for making epoxy resin cellular plastics by foaming polyepoxides in a reaction mixture comprising, in addition to the polyepoxide, a readily volatile organic solvent as a foaming agent and a curing catalyst, the improvement which comprises using a curing catalyst comprising from 1 to 30 mole percent, based on the average epoxide equivalent of the polyepoxide, of monofluophosphoric acid.

2. A process according to claim 1 wherein the curing catalyst comprises, in addition to monofluophosphoric acid, one or more other acid phosphorous compounds.

3. A process according to claim 1 wherein said fluophosphoric acid is used in solution in a monomer copolymerizable with the polyepoxide.

4. A process according to claim 1 wherein said fluophosphoric acid is used in solution in a compound which forms an additive combination with the polyepoxide.

5. A process according to claim 1 wherein fluophosphoric acid is used in the form of a solution thereof in a cyclic ether or lactone.

6. A process according to claim 1 wherein said fluophosphoric acid is used in the form of a solution thereof in an alkyl-phosphonic acid, a phosphoric acid monoester or an aromatic polyhydroxy compound.

7. A process according to claim 1 wherein said fluophosphoric acid is used in the form of a solution in eta-caprolactone.

8. A process according to claim 1 wherein said catalyst is a solution of monofluophosphoric acid and orthophosphoric acid in eta-caprolactone.

9. A process according to claim 1 wherein said catalyst is a solution of monofluophosphoric acid and orthophosphoric acid in vinylphosphonic acid.

10. A process according to claim 1 wherein lactones or cyclic ethers copolymerizable with polyepoxides are incorporated in said reaction mixture.

References Cited

UNITED STATES PATENTS

| | | | |
|---|---|---|---|
| 3,311,573 | 3/1967 | Graham et al. | 260—2.5 |
| 3,477,966 | 11/1969 | Doss | 260—2.5 |

JOHN C. BLEUTGE, Primary Examiner

U.S. Cl. X.R.

260—2 EP, 47 EPC, 835